April 22, 1941.  R. J. FISHER  2,238,996
SOUND TRACK CLEANER FOR MOTION PICTURE FILM
Filed Dec. 1, 1936   4 Sheets-Sheet 1

INVENTOR.
Roy J. Fisher
BY Cumpston & Shepard
his ATTORNEYS

April 22, 1941.   R. J. FISHER   2,238,996
SOUND TRACK CLEANER FOR MOTION PICTURE FILM
Filed Dec. 1, 1936   4 Sheets-Sheet 2
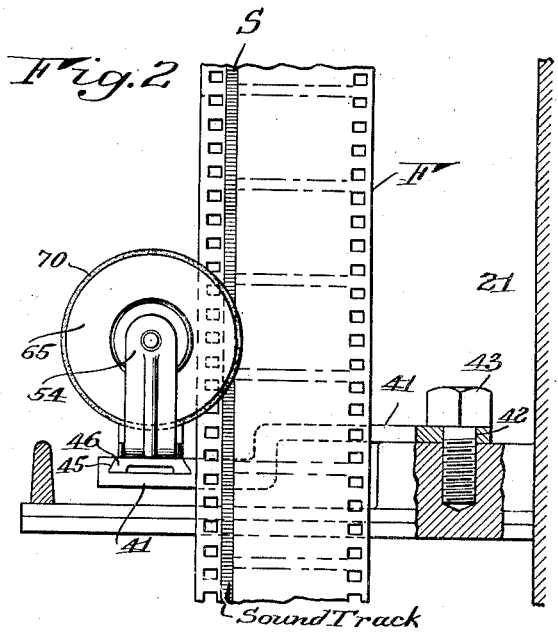
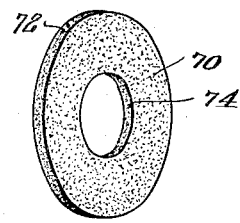
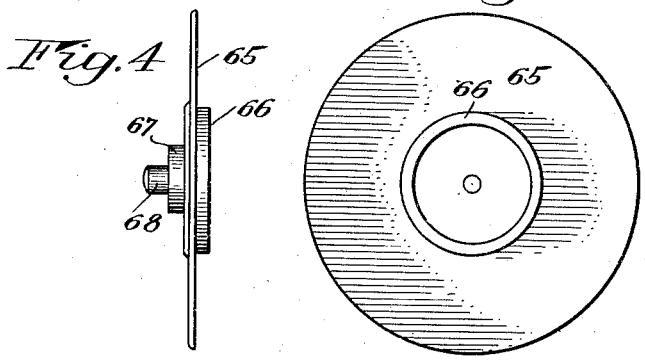
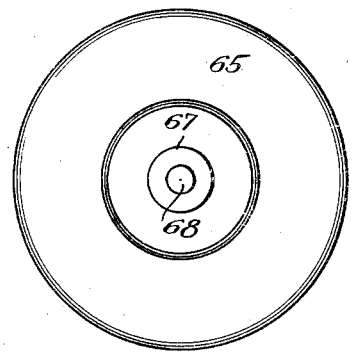
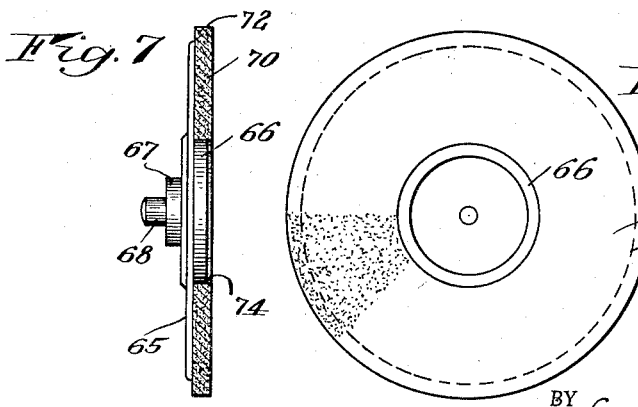
INVENTOR.
Roy J. Fisher
BY Cumpston & Shepard
his ATTORNEYS April 22, 1941.   R. J. FISHER   2,238,996
SOUND TRACK CLEANER FOR MOTION PICTURE FILM
Filed Dec. 1, 1936   4 Sheets-Sheet 3
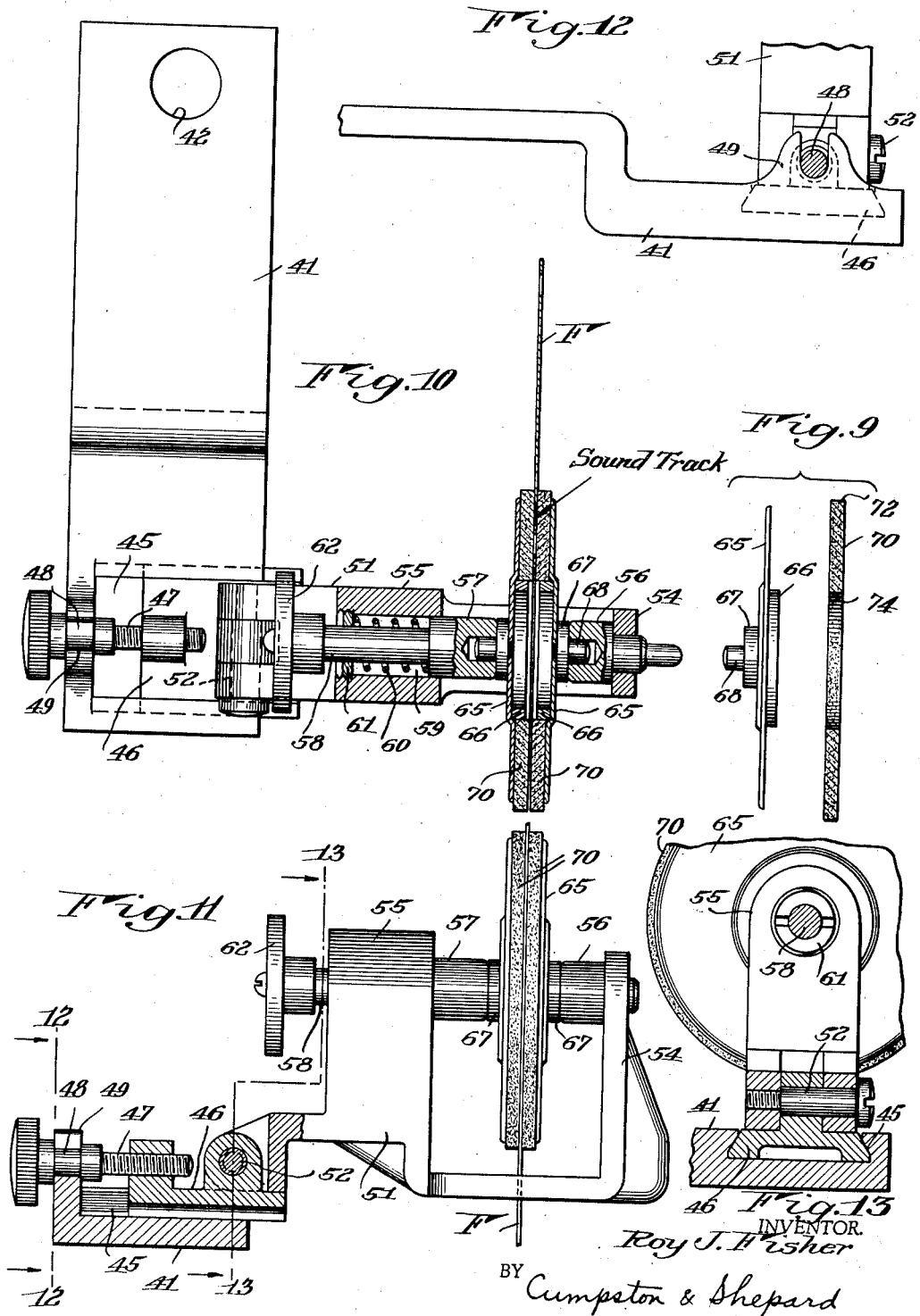
INVENTOR.
Roy J. Fisher
BY Cumpston & Shepard
his ATTORNEYS April 22, 1941.  R. J. FISHER  2,238,996
SOUND TRACK CLEANER FOR MOTION PICTURE FILM
Filed Dec. 1, 1936  4 Sheets-Sheet 4
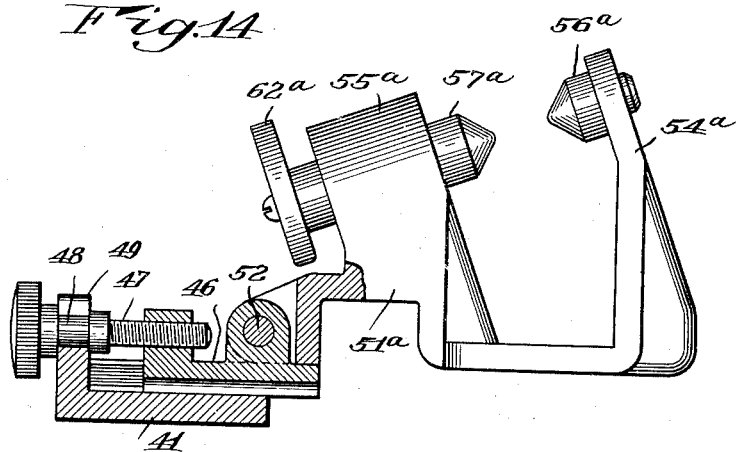
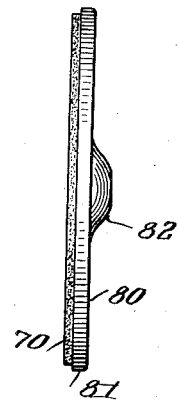
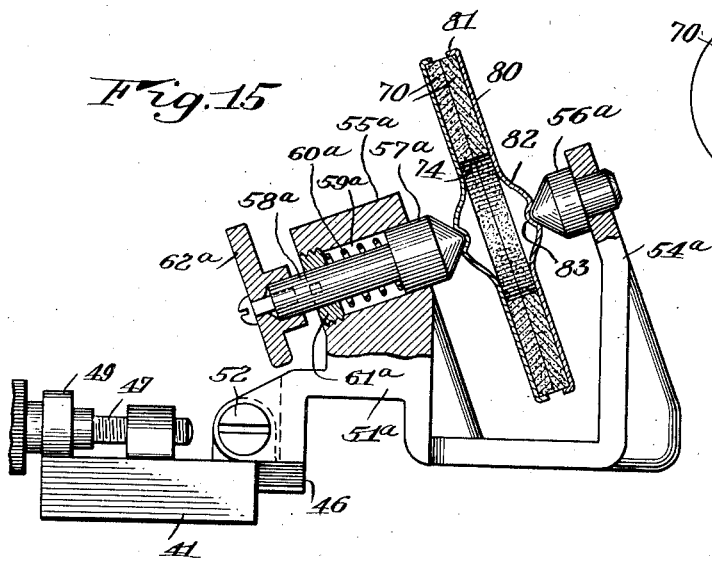
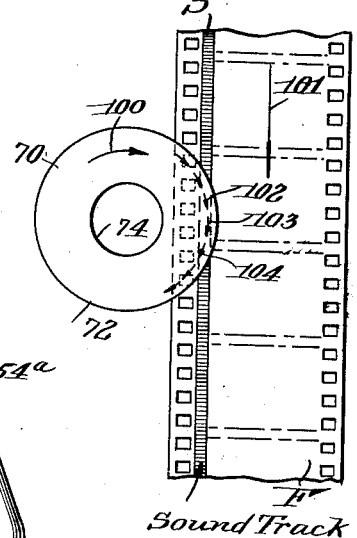
Sound Track
INVENTOR.
Roy J. Fisher
BY Cumpston & Shepard
his ATTORNEYS Patented Apr. 22, 1941

2,238,996

UNITED STATES PATENT OFFICE 2,238,996

SOUND TRACK CLEANER FOR MOTION PICTURE FILM

Roy J. Fisher, Rochester, N. Y., assignor, by mesne assignments, to Harold J. Nagle, Roy J. Fisher, and Nelson H. Copp, all of Rochester, N. Y., as joint trustees Application December 1, 1936, Serial No. 113,677

7 Claims. (Cl. 15—100)

This invention is a device for cleaning the sound track, or zone on which sound is recorded, of moving picture film or the like.

A primary object of the invention is to improve the reproduction of sound recorded on film or the like.

Another object of the invention is to provide a simple and effective device which will clean the sound track of film in order to enable better reproduction of the sound recorded on such sound track.

Still another object is the provision of a device of this kind which is compact in size, sturdy in operation, and which can be applied to existing moving picture projectors.

A further object is the provision of a device capable of cleaning, if desired, other portions of the film in addition to the sound track.

A still further object is the provision of a cleaning device which will clean the film much more efficiently and satisfactorily than any prior cleaning device.

To these and other ends the invention resides in certain improvements and combinations of parts, all as will be hereinafter more fully described, the novel features being pointed out in the claims at the end of the specification.

In the drawings:

Fig. 2 is a fragmentary elevation of some of the parts shown in Fig. 1, with parts in vertical section, viewed from a direction at right angles to the direction of view in Fig. 1;

Fig. 3 is a perspective view of a replaceable cleaning disk forming part of the present invention;

Fig. 4 is an edge view of a holder for such a disk, constructed in accordance with a preferred embodiment of the invention;

Fig. 5 is a front face view of the holder shown in Fig. 4;

Fig. 6 is a rear face view of the holder shown in Fig. 4;

Fig. 7 is a view similar to Fig. 4 showing the holder with the cleaning disk applied thereto;

Fig. 8 is a front face view of the disk on the holder;

Fig. 9 is an edge view of the disk and the holder in separated relationship, showing the parts as they appear when the disk is being applied to or removed from the holder;

Fig. 10 is a plan of the cleaning device in its preferred form, removed from the projector, with parts in horizontal section;

Fig. 11 is an elevation of the parts shown in Fig. 10, with a fragment in vertical section;

Fig. 12 is a vertical section taken substantially on the line 12—12 of Fig. 11;

Fig. 13 is a vertical section taken substantially on the line 13—13 of Fig. 11;

Fig. 14 is a view similar to Fig. 11 showing a modified form of construction of the device with the disks and their holders removed therefrom;

Fig. 15 is a view similar to Fig. 14 with the disks and holders in position;

Fig. 16 is an edge view of one of the disks and its associated holder according to this modified form of the invention, and Fig. 17 is a face view of the film and a cleaning disk in operative relation thereto, showing the relationship of the cleaning movements of the disk to the motion of the film.

The same reference numerals throughout the several views indicate the same parts.

Figure 1:
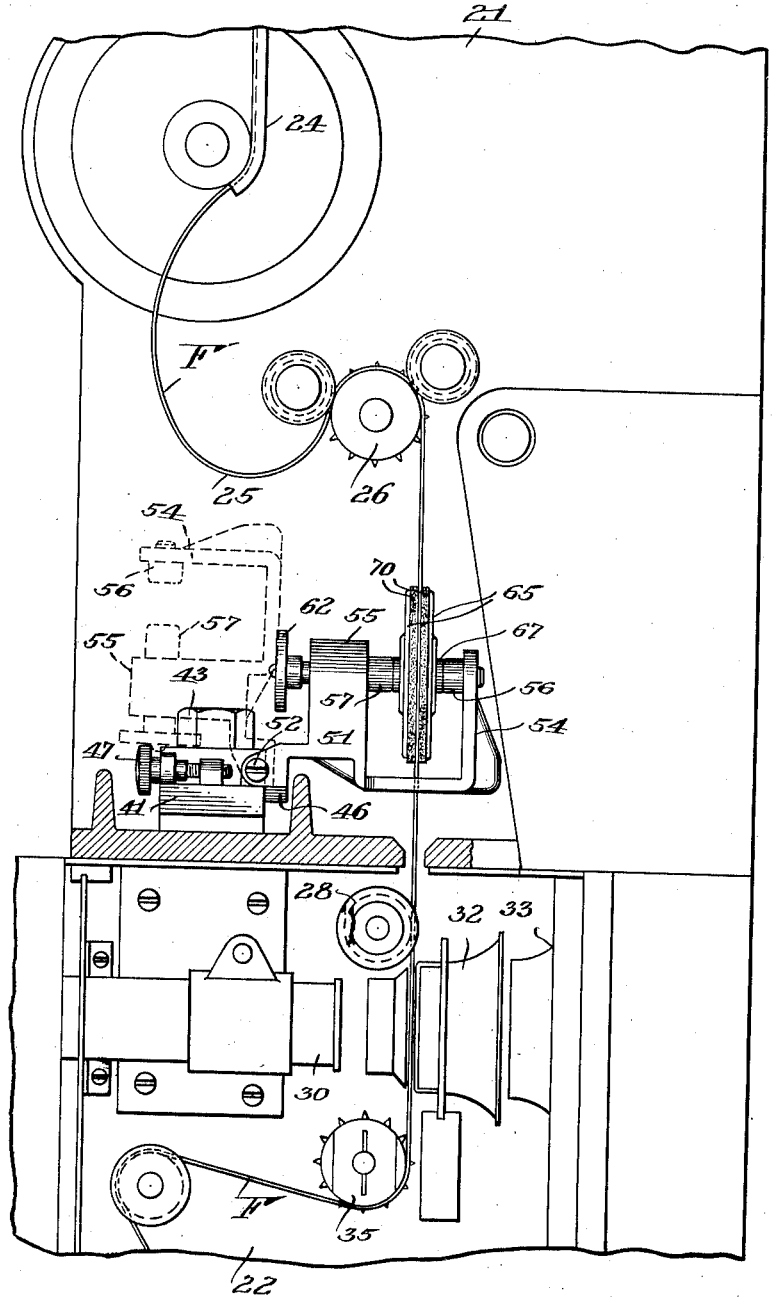
Fig. 1 is a side elevation of a fragment of a moving picture projector with a cleaner constructed according to a preferred embodiment of the invention applied thereto.

Referring first to Fig. 1 of the drawings, there is shown somewhat diagrammatically a moving picture projector including a picture projecting part indicated in general at 21 and a sound head or sound reproducer indicated in general at 22, both of which may be of any suitable known construction, and neither of which per se, forms any part of the present invention. In such projecting apparatus as commonly constructed and as well known in the art, the film F passes downwardly through a chute 24 immediately after the projection of picture images on the film, then forms more or less of a loop 25 and passes partly around the driving sprocket 26 which has teeth engaging with the marginal perforations in the film. Then the film passes downwardly, sometimes approximately vertically, as here shown, and sometimes at a substantial angle to a vertical plane, to the sound head or sound reproducing mechanism. The film passes a guide roller 28 near the top of the sound head, thence goes past the so-called "electric eye" or photoelectric mechanism, including means indicated diagrammatically at 30 for projecting light through the sound track of the film, and means indicated diagrammatically at 32 and 33 for varying the strength of an electric current in accordance with the amount of light passing through the sound track of the film. After passing this electric eye 30, 32, 33, the film F passes partially around another driving sprocket 35 having teeth engaging the perforations in the film, and then goes to any suitable rewinding mechanism.

Since the sound reproducing mechanism functions in accordance with the amount of light which passes through the sound track of the film, it is apparent that any dirt or foreign matter which interferes with the transmission of light through the sound track, will result in an untrue or incorrect reproduction of the sound recorded on the film. In order to obtain true and faithful reproduction of the recorded sound, it is of the highest importance, therefore, that the sound track of the film be clean, so that the amount of light transmitted through the sound track to operate the sound reproducing apparatus, shall be subject only to the intended conditions produced when the sound was recorded, and not to unintended and varying conditions of dirt. The importance of even a slight amount of dirt on the sound track can be better realized when it is known that the amplifying system interposed between the electric eye and the loud speaker frequently amplifies or multiplies the electric currents by as much as several million times. Hence even a minute piece of dirt on the sound track, such as a small speck of dust or piece of lint, will cause quite a loud undesirable noise to issue from the loud speaker.

Although cleanliness of the sound track is of the greatest importance in faithful reproduction of recorded sound, as can be seen from the above explanation, yet this is a field which has been grossly neglected prior to the present invention. Some attempts have heretofore been made to clean moving picture films, but usually this was done in the wrong way and at the wrong time insofar as enhancing faithful reproduction of sound is concerned. It has been proposed, for example, to clean the films at the film exchange, before they are delivered to the theater which is to show them. Such cleaning is at the wrong time, because it is too long in advance of the actual showing of the film, and the film is likely to become dirty again before it is shown, or at least before the last showing of the film at any one particular theater before it goes back to the exchange for another cleaning. Each time that the film passes through the projector it is practically certain to become somewhat dirty, and if the same film passes through the projector several times a day and several days a week, it is apparent that toward the end of the week's run of the film, it will be quite dirty and will give faulty sound reproduction even though the film may have been fairly clean when it was first received from the film exchange.

Prior attempts to clean the films have also usually been carried out in the wrong way, as well as at the wrong time. The cleaning apparatus has been inefficient, and often has resulted in more harm than good so far as the sound track is concerned, since it has had the effect of stirring up dirt from the picture part of the film and depositing some of it on the sound track part of the film, leaving the sound track dirtier than before.

The present invention, as distinguished from these prior attempts at film cleaning, provides a cleaning device which cleans the desired part of the film in a highly efficient manner, and at the most propitious time. In its preferred form, the invention comprises a cleaning device applied to the projector in such position as to act upon the film immediately in advance of the electric eye or sound reproducing mechanism. That is, the film is cleaned after it passes the picture projecting part of the apparatus, thus removing any dirt that may have fallen upon the film in this picture projecting part, and the cleaning is completed just before the film passes the electric eye, so that there is no substantial chance even of dust or lint falling upon the film between the time it is cleaned and the time that it enters the electric eye.

In the preferred form of cleaner, illustrated in Figs. 1 to 13, inclusive, there is provided a supporting arm 41 having a hole 42 by which it may be secured to the projector 21 as by means of a bolt 43 passing through the hole. Preferably this is one of the standard bolts commonly found on the projector, which is simply removed and then again inserted in the machine through the hole 42 of the arm 41. If the thickness of the arm 41 makes a longer bolt necessary, a new and longer bolt may be substituted for the original bolt on the machine, but in any event it is preferably unnecessary to drill any additional bolt holes in the projector.

The arm 41 carries an undercut or dovetailed guideway 45 (Figs. 10 and 13) in which is slidably received a slide member 46 of corresponding dovetailed construction to interlock with the guideway. This slide 46 is moved in a direction toward and away from the plane of the film F by means of an adjusting screw 47 threaded through an upstanding lug on the slide 46 and having a reduced portion 48 received in and held against longitudinal movement by a U-shaped extension 49 on the arm 41.

The slide 46 carries a bracket indicated in general at 51, pivoted to the slide 46 by a pivot pin 52 approximately parallel to the plane of the film F at the point where the cleaning device contacts with the film, and approximately perpendicular to the direction of longitudinal movement of the film. The bracket 51 is of somewhat U-shaped form in side elevation, as shown in Figs. 1 and 11, and carries two upstanding arms, 54 and 55, arranged on opposite sides of the plane of the film F. The arm 54 carries a stationary bearing member 56, while the wider arm 55 carries a similar bearing member 57 constituting one end of a plunger 58 movable longitudinally through a bore 59 in the arm 55. A spring 60 presses against the head of the plunger and against a reaction piece 61 in the opposite end of the bore, to tend constantly to move the plunger 58 in a direction toward the arm 54 and bearing 56. A finger piece 62 may be conveniently grasped to withdraw the plunger when desired.

Two cleaning disk holders are provided, both of which may be of identical construction, so that the parts of both of them are indicated by the same reference numerals. Each of these holders comprises a disk-like body 65 of metal or other suitable relatively rigid material, having a substantially flat or plane annular marginal portion and a slightly offset central portion, as best shown in Fig. 10. A ring 66 rigidly secured to the plate 65, projects outwardly from the front face thereof, as shown. On the rear of each plate 65, centrally thereof, is a bearing member 67 having a reduced bearing stud 68 projecting rearwardly therefrom. The bearing stud 68 is of a size to be received in a recess in either of the bearing members 56 and 57, to form a rotary axis for rotation of the holders 65.

Each holder 65, in normal position of use, carries a cleaning disk indicated in general at 70. This cleaning disk is preferably of annular form, having a central hole of a size to receive the ring 66 of the holder, the outer periphery of the cleaning disk 70 being of approximately the same or slightly larger diameter than the periphery of the holder plate 65. Each of the two opposite surfaces or faces of each cleaning disk 70 is preferably plane or approximately plane, and preferably also is substantially smooth, although cuts, grooves, or slots may be formed in one or both faces if desired.

The disks are applied to the holders by placing a disk in proper alinement with a holder, as shown, for example, in Fig. 9, and then moving the disk and holder laterally together from the relationship shown in Fig. 9 to the relationship shown in Figs. 7 and 10. The ring 66 forming an integral part of the holder and fitting within the central aperture of the disk, retains the disk concentrically on the holder, preventing radial displacement thereof.

Two disk and holder assemblies are then placed face to face, as in Figs. 10 and 11, and the bearing pins 68 of the two holders are then inserted in the holes in the bearing members 56 and 57 of the bracket 51 by grasping the two disk assemblies in one hand and pulling leftwardly on the finger piece 62 of the plunger 58 with the other hand, to open the space between the members 56 and 57 far enough to receive the pins 68 of the two holders. Then when the finger piece 62 is released, the spring 60 tends to move the bearing member 57 toward the bearing member 56 and thus engages the bearing members over the pins 68 of the two holders. These pins 68 now form pivots or trunnions on which the disks and holders may revolve.

The disks and holders are of such size, and so placed with relation to the film, that the desired part of the width of the film is embraced between the two cleaning disks 70 and the operative cleaning faces of the two disks contact with opposite surfaces of this desired part of the width of the film. The sound track S of the film (see Fig. 2) is usually placed near one marginal edge of the film. Preferably the size and relationship of the various parts is such that the cleaning disks 70 overlap and contact with only that part of the width of the film which extends from the marginal edge thereof nearest the sound track, to and across the width of the sound track and a slight distance beyond it, as shown in Fig. 2 and preferably the disks do not overlap or contact with any substantial part of the picture width or picture zone of the film, such picture zone extending from the sound track S toward the other or more remote marginal edge of the film.

With this preferred relationship, the outer peripheral edge 72 of each disk 70 extends to a position just slightly inwardly (that is, toward the center line of the film) from the inner edge of the sound track S. The inner peripheral edge 74 of each disk 70 does not overlap the film but, at its closest point, is preferably almost tangent to the adjacent edge of the film or slightly outwardly from such edge, as shown in Figs. 10 and 17. If desired, the hole in the center of each disk 70 may be made larger until the inner periphery 74 of the disk is just outside of the outer edge of the sound track S so that the face of the disk is a narrow annular band having a width only slightly greater than that of the sound track, but usually it is preferred to make the face of the disk wider than this, and to make it cover that part of the width of the film from the inner edge of the sound track to the adjacent outer edge of the film.

When using the device, the film is usually threaded through the projection apparatus while the disks 70 and holders 65 are removed from the cleaning device and while the bracket 55 is swung up out of the way, to the dotted line position shown in Fig. 1. Then when the threading of the film through the apparatus has been completed, the bracket 55 is swung down about its pivot 52 from the dotted line position to the full line position shown in Fig. 1, the finger piece 62 is pulled leftwardly to open up the space between the bearings 56 and 57, and the pair of cleaning disks and holders is inserted between the bearings 56 and 57 in the manner above described. Grasping the associated pair of disks and holders near one edge will cause a slight separation between the cleaning disks at a point diametrically opposite the point at which they are grasped, and advantage can be taken of this fact in placing the disks easily and quickly in embracing relationship to the sound track edge of the film.

The adjusting screw 47 can be turned as necessary to move the slide 46 back and forth until the disks are at exactly the proper alinement with the film, so that as the film runs through the cleaning disks, it is not deflected to one side or the other of its normal plane by these disks, but can remain truly in its normal position just as though the cleaning device were not present.

In some forms of projectors, the film moves down toward the sound head on a slant, as above mentioned, instead of moving substantially vertically as shown in Fig. 1. When the cleaning device is made for use on such projectors, the form of the bracket 51 is slightly changed in order to place the disks at the proper angle to receive the film. Such a bracket arrangement intended for film running at a substantial angle to a vertical direction, is illustrated in Figs. 14 and 15, where the parts 41 and 46 to 49 remain as before, and are indicated by the same reference numerals used for the corresponding parts in the previously described embodiment. The pivot 52 may likewise remain as before. The bracket mounted on the pivot 52, here designated by the numeral 51a, has upstanding arms 54a and 55a corresponding in general to the previously described arms 54 and 55, but tilted at an angle as shown. Bearing members 56a and 57a are employed, as before, in conjunction with the two arms 54a and 55a, respectively, the bearing member 57a being mounted on a plunger 58a operating in a bore 59a of the arm 55a. As before, the plunger is constantly pressed by a spring 60a in a direction toward the other bearing member 56a, the spring pressing at its left hand end against a reaction piece or plug 61a, and a finger piece 62a is attached to the plunger 58a to pull it leftwardly in order to permit insertion and removal of the cleaning disks and holders.

The shape of the bracket or mounting member on which the cleaning disks and their holders are supported, may be varied as required in order to meet varying design of the projector or other varying conditions. It is believed that the two different examples of shapes of brackets will be sufficient to enable those skilled in the art to make a satisfactory bracket to fit any particular condition of service.

The construction of the holders 65 themselves may also be modified if desired. The holder construction illustrated in Figs. 4 to 10, inclusive, and previously described, is at present preferred for use in most situations, irrespective of the particular shape or angle of the bracket 51. One of the various alternative forms of holder which may be used if desired is illustrated in Figs. 15 and 16. This alternative holder comprises a generally disk-shaped metal member 80 having an outwardly directed marginal or peripheral flange 81, and having at its center, on the opposite side of its face, a bump or boss 82 provided with a central cavity 83. Instead of having a trunnion pin on the holder to project into a hole in the bearing, as was the case in the previous embodiment of the holder, this alternative form of holder is intended for use with a pin or projection on the bearing which extends into the cavity 83 of the holder. Hence when this form of disk holder is employed, the bearing members 56a and 57a of the bracket are provided, for example, with conical or pointed ends, as shown in Figs. 14 and 15, which enter the cavities 83 of the holders and form trunnions on which the two holders may rotate.

It is noted that both forms of holder have means for engaging with a peripheral surface of the annular cleaning disk 70 to maintain the cleaning disk in proper relation to the holder. In the first form of holder, the ring 66 engages the inner peripheral edge 74 of the disk 70 to hold the disk in place. In the second or modified form of holder, the marginal flange 81 engages the outer peripheral edge 72 of the disk 70 to hold the disk in place. Both the ring 66 and the marginal flange 81 are shallower than the thickness of the disk 70 so that the plane of the face of the disk lies beyond the top of the ring 66 or the flange 81, and the ring or the flange thus can not come into undesired contact with the film when the parts are in normal operative position.

The composition of which the disk 70 is made, is of importance. It should be of a material softer than the film with which it is to be used and softer than the emulsion or coating on the film, so that it will not scratch or otherwise injure the film or its coating. It should also be a material which does not "glaze" readily, and it should have the power of collecting and retaining a relatively large amount of dirt. Also it should not be a material from which particles fall off, for such particles would then fall off the cleaning disk and remain on the sound track of the film and cause undesirable noise in the subsequent sound reproduction, largely defeating the beneficial effect of the cleaning device. The cleaning disk material also should be somewhat resilient and flexible, for best results.

Woven textile fabric, such as cotton, woolen or linen cloth, and felted material, such as hair felt, may be used for the cleaning disk 70 under some circumstances, especially if impregnated or otherwise treated to reduce the likelihood of fibers of the material falling off of the body of material. Usually, however, such woven or felted materials are not particularly satisfactory, and although the use of such materials is within the scope of this invention, their use is not preferred.

Thick blotting paper may also be used for making the disk 70 with some degree of success, though this also is not preferred, because the blotting paper tends to "glaze" or form a hard glazed surface after a relatively small amount of use.

Cork or a cork composition may also be employed. Natural sheet cork is found to be somewhat harder than desirable, and to lack the desirable dirt absorbing or retaining qualities which the disk should possess for best results. Hence, although sheet cork is within the scope of the invention, it is not preferred.

The material which is at present preferred for the manufacture of the cleaning disk 70 is a composition, the principal ingredients of which are small particles of cork and animal or vegetable fibers, held together in a practically homogeneous composition by means of a binding and softening material including glycerine and glue. Jute fibers are preferred for the fibrous part of this composition though other animal or vegetable fibers (such as hemp, cotton, linen, wool, etc.) may be substituted if desired. A material of this kind is manufactured by the Garlock Packing Company, of Palmyra, New York, and is commonly available on the market, under the commercial name or trade designation of "Garlock 660" or "Garlock 661." This material has heretofore been used for making gaskets or packings, but so far as known at present, has never before been used for the purposes of the present invention or for any comparable purposes.

The above described cork and jute composition is found to be particularly suitable for making the cleaning disks of the present invention, which disks may simply be cut out of a sheet of this material as obtained on the open market. Cleaning disks 70 made of this material have been found, by repeated tests, to be particularly efficient in picking up and retaining such dirt as is present on the sound track of the film. The composition of material is sufficiently homogeneous so that particles of it do not flake off or become detached from the main body, and thus foreign matter is not deposited on the film from the cleaning disk, as might be the case if the cleaning disk were made of felt or a textile material. In use, one face of each of the two cleaning disks used together, is usually sufficient to clean about 2000 feet of moving picture film of the usual average degree of dirtiness. Then the disks and holders are removed, the disks are reversed on the holders so that the dirty faces of the disks will lie next to the respective holders, and the same disks and holders are replaced in the device with the fresh or clean faces of the disks in contact with the film. These same disks may now be used for cleaning an additional 2000 feet of film, assuming the film to be of average degree of cleanliness, so that, by using both faces of each disk, a pair of disks will clean normally about 4000 feet of film. Then the disks, having been used on both faces, are entirely discarded and new disks are placed on the holders.

The constructions shown in the drawings and above described must be regarded merely as illustrative embodiments of the invention and not as limitations thereon. Many features of the invention are believed to be broadly new, and may be employed by themselves, omitting other features used with them in the foregoing illustrative embodiments, without departing from the scope of the invention.

The invention may be said to include broadly the provision of a rotary film-cleaning member rotating about an axis in non-parallel relation to the plane of the film. Preferably, but not necessarily, the axis of rotation of the cleaning member is at a substantial angle to the plane of the film, and preferably, but not necessarily, this substantial angle is approximately a right angle. If the cleaning member rotates about an axis parallel to the plane of the film, the surface of the cleaning member which contacts with the film is necessarily a substantially cylindrical surface, thus making a single line contact with the film, which gives poor cleaning results. If the cleaning member rotates about an axis approximately perpendicular to the plane of the film, the surface of the cleaning member which contacts with the film may be an approximately flat or plane surface, contacting with the film over a substantial area rather than a single line, thus giving highly superior cleaning results. If the cleaning member rotates about an axis arranged somewhere between parallel relation and perpendicular relation to the plane of the film, the surface of the cleaning member which contacts with the film may be a generally conical surface, and it may be so constructed according to this invention.

Theoretically, a conical surface will, like a cylindrical surface, give only a line contact with the film. In actual practice, however, a conical surface will give a substantial area of satisfactory contact, especially if the apex angle of the cone be relatively large and the point of contact with the film be at a substantial distance from the apex of the cone, so that the contacting surface of the cone is not greatly curved but approaches more or less closely to a flat or plane surface. Conical cleaning members usually give results inferior to those obtained from cleaning members with disk-like flat or plane cleaning surfaces, so such conical members are usually not preferred, but they usually give results far better than cylindrical cleaning members. When it is desired to employ a conical cleaning member, the apex angle should preferably (but not necessarily) be more than about one hundred degrees, and should preferably approach 180°. Also the material of which the conical cleaning member is made should preferably be sufficiently resilient and compressible so that the pressure of the cleaning member against the film will cause the cleaning member to flatten into a substantial area of contact with the film, rather than maintain a line contact or almost a line contact. To accomplish this, an increasingly greater degree of resilience and compressibility is required as the apex angle of the cone decreases from 180°.

When a rotary cleaning member is employed the axis of rotation of the cleaning member may intersect the plane of the film either within or outside of the side edges of the film. A rotary axis intersecting the plane of the film at a point laterally outside of the side edges of the film is preferred, and such an arrangement is illustrated in the drawings. If the axis of rotation intersects the plane of the film inside the side edges of the film, this intersection may be along the longitudinal center line of the film, or to one side thereof. An intersection to one side of the center line of the film is preferred, especially if the motion of the film itself is relied upon to turn the rotary cleaning member, so that there will be an off-set or eccentric relationship between the cleaning member and the film, with the result that longitudinal motion of the film will tend to turn the cleaning member.

It is within the scope of this invention to employ a single cleaning member contacting with one surface of the film, although preferably two cleaning members are used, to clean two opposite surfaces of the film. If a single cleaning member is employed, any suitable backing member may be used on the opposite side of the film, to cause the desired degree of pressure between the film and the cleaning member. The backing member may be fixed, such as a stationary plate, or movable, such as a roller. If two cleaning members are used on opposite sides of the film, as in the preferred form, they may be offset from each other either transversely or laterally of the film, or both, although preferably they are directly opposite each other and preferably the axes of rotation of the two cleaning members are substantially coincidental with each other.

If a rotary cleaning member is employed, as in the illustrative embodiment above described, it is preferably driven or rotated by the longitudinal motion of the film itself. It may, however, be driven independently of the motion of the film, by any suitable independent drive, either at the same rate of speed as the travel of the film, or at a faster rate or a slower rate, as desired. Also, it may be rotated in a reverse direction, instead of in the same direction as that in which the film travels. If two rotary cleaning members are used on opposite sides of the film, they need not necessarily be driven in the same way. One cleaning member on one side of the film may be driven by the motion of the film while the other member may be driven by a positive drive. One member may be driven faster than the other. One member may be driven in a reverse direction with respect to the movement of the other. A plurality of cleaning members may be employed at points spaced from each other in the direction of travel of the film and one of such members may be driven in one way or in one direction while another of such members, contacting with the same part of the film at a different point in the travel of the film, may be driven in another way or in another direction.

Viewed from one aspect, the invention comprises broadly the provision of cleaning means which wipes the film in a direction having a component transverse to the direction of longitudinal movement of the film. This is conveniently and preferably accomplished by rotary cleaning means of disk-like or approximately disk-like form, such as the cleaning means already disclosed in connection with the illustrative embodiments described. Referring to the diagram constituting Fig. 17 of the drawings it is seen that when the cleaning member 70 rotates in the direction of the arrow 100 and the film F moves longitudinally in the direction of the arrow 101, any given point on the disk 70 near the periphery thereof will wipe transversely across the sound track S, first in a direction from the outer edge of the film toward the center line of the film, and then in another direction back toward the outer edge of the film. For instance, a given point near the outer periphery 72 of the disk 70, represented by the first of the small arrows to the right of the large arrow 100, passes successively through the other positions represented by the other small arrows shown. As this point reaches approximately the position of the arrow designated by the numeral 102, the point on the face of the disk moves across the width of the sound track S toward the center line of the film. Then, as this point reaches the position of the arrow 103, it will start to move transversely across the sound track in a reverse direction, finally leaving the outer edge of the sound track approximately at the tip of the arrow 104.

Although this transverse wiping action constituting a feature of the present invention is preferably secured by rotary means, yet it may also be secured according to the present invention by oscillating or transversely reciprocating means, such as a swinging arm on which a cleaning member is mounted or a transversely slidable member on which a cleaning member is mounted. The arm or slide may be driven by a spring motor or a weight motor (like clockwork) or by an electric motor, or if the cleaning device is applied to a motion picture projector, it may be driven by a belt, chain, shaft, or other suitable drive from any suitable moving part of the projector.

The wiping surface or film contacting surface of the cleaning member is preferably smooth and continuous, but is not necessarily so. It may be scored or provided with slots, holes, perforations, cavities or other formations breaking up or interrupting the continuity of the surface.

If the cleaning member is of the rotary disk type, and especially if two such cleaning members are used in face to face relation with each other as in the illustrative embodiment, the cleaning member is preferably provided with one or more cavities or recesses furnishing reservoirs in which dirt may accumulate. In the illustrative form above disclosed, such a reservoir is provided by the central hole within the inner peripheral edge 74 of each cleaning disk 70. While it may at first glance seem contrary to normal expectations, nevertheless it is an observed fact that in use the dirt removed from the film by the cleaning member tends to work inwardly toward the center of the disk, and accumulates in the central hole. If these central holes or reservoirs were not provided accumulation of dirt might even reach such proportions that it would cause axial separation of the disks from each other, so that the outer edges of the disks would not contact firmly with the film.

Viewed from another aspect, the invention comprises broadly the provision of cleaning means for cleaning only a desired minor part of the width of the film without cleaning the major part of the width thereof, this desired minor part being preferably the sound track of the film. The advantage of cleaning means for cleaning only a minor part of the width of the film which it is especially desired to clean, is that the cleaning means can operate more effectively and produce a higher degree of cleanliness upon a narrow strip of film than upon the full width thereof. If all parts of the width of film are of approximately equal dirtiness, then a cleaning member wiping over the entire width of the film would quickly accumulate dirt from the picture zone or picture strip of the film and this accumulation of dirt would detract from the ability of the cleaning member to clean properly the sound track strip or zone of the film, and would require the cleaning member to be discarded and replaced by a fresh cleaning member much sooner than would be the case if the cleaning member confined its operations to the narrow strip of the film in which a high degree of cleanliness was most desired. Hence in its preferred form, the cleaning means of the present invention does not operate upon any substantial part of the picture zone or strip of the film, but overlaps one edge of the picture zone only to a slight extent sufficient to insure a thorough cleaning of the sound track.

Nevertheless, it is within the scope of the present invention to employ the cleaning means herein disclosed for cleaning the entire width of the film, or any desired part thereof other than or in addition to the sound track, even though this is not preferred. By using cleaning members of somewhat larger size, and replacing them oftener than would be necessary if only the sound track were cleaned, the cleaning means of the present invention may readily be used to clean the entire width of the film, and when so used, the cleaning means may be mounted either on the projector (preferably just in advance of the picture projecting mechanism thereof) or on the rewinding table or mechanism. The cleaning means may also be used in a film exchange, to clean the film before delivery thereof to the theater, and when so used, the cleaning means may be designed to clean the sound track alone, or the picture zone alone, or the whole width of the film.

It is also possible to employ cleaning means according to the present invention to clean the picture zone alone, and other cleaning means according to the present invention to clean the sound track alone. The cleaning means for the picture zone may conveniently be in the form of disks of somewhat larger diameter with respect to the width of the film, than the diameter of the sound track cleaning disks 70, and these picture zone cleaning disks may be mounted for rotation about axes intersecting the plane of the film at a point on the opposite side of the center line of the film from the sound track. The picture zone cleaning means and the sound track cleaning means may be mounted in any desired relationship to each other. For example, the picture zone cleaning means may be mounted on the projector immediately in advance of the picture projecting mechanism, while the sound track cleaning means may be mounted on the projector immediately in advance of the electric eye or sound reproducing mechanism. Or again, where the very highest degree of cleanliness of the sound track is desired for faithful reproduction of the recorded sound, cleaning means mounted on the projector immediately in advance of the picture projecting mechanism may be employed to clean the full width of the film, both sound track and picture zone, and other supplemental cleaning means for the sound track alone may be mounted on the projector immediately in advance of the electric eye or sound reproducing mechanism, to give a final cleaning to the sound track already fairly well cleaned just before the picture was projected.

It is, therefore, seen that the invention comprises a great many features, many of which are preferably used in conjunction with each other as indicated by the illustrative embodiments described, but which need not necessarily be used in conjunction with each other under all circumstances. Hence the invention is of great flexibility and adaptability, since many separate features thereof may be used in many different relationships, within the scope of the disclosure herein set forth. It is intended to claim all these features of the invention in all the different relationships in which the respective features may be new and patentable, and it is not desired to have the claims limited to the particular structures or relationships which have been shown and described merely as a preferred illustrative embodiment of the invention.

It is to be especially noted that the film cleaner acts upon the film in a dry state or condition, and does not add moisture to the film or attempt any cleaning action by liquid means. This is important, because liquid added to the film for cleaning purposes may have a tendency to soften the emulsion or coating on the film and deteriorate the same. Moreover, even if a liquid which has no deleterious effect on the film coating is used, a film cleaner of the liquid type is not satisfactory for use on the projector to clean a film before projecting it, for the reason that the cleaner may not perfectly remove all vestiges of liquid from the film, and if any liquid remains upon the film at the time of projection, the liquid will interfere with proper projection of light through the film. Hence those cleaning devices which employ liquid, if suitable under any circumstances, can at most be used satisfactorily only at a substantial time interval before the film is projected, in order to make sure that the film is completely dry by the time of projection. Moreover, when liquid is used for cleaning, the drying member of the cleaning apparatus must be made of felt or similar fibrous absorbent material in order to absorb the moisture, and it is found that particles of fibres disintegrate from the drying member and adhere to the film, forming specks thereon which interfere with proper projection of light and will cause extraneous noise in the sound reproducing operation. With the dry cleaner of the present invention, however, it is not necessary to allow time for the film to dry thoroughly, and accordingly this cleaner may be used and preferably is used on the projector, cleaning the film as it passes through the projector. Since no liquid is used, the cleaning member need not be of absorbent fibrous material, and hence a material which cannot disintegrate and form specks on the film may be employed, which cannot be done in the liquid type of cleaner.

I claim:

1. Means for cleaning moving picture film while the film is in motion, comprising a bracket having two arms, bearing means on said arms on opposite sides of the plane of the moving film, two holders, one rotatably mounted on said bearing means on each arm, and two cleaning members removably mounted on said holders, said cleaning members embracing between them at least a part of the width of said film to tend to clean said embraced part of the width thereof as the film moves past said cleaning members.

2. Means for cleaning moving picture film while the film is in motion, comprising a holder mounted for rotation about an axis adjacent a moving section of the film, and a separate disk-like cleaning member placeable on and removable from said holder, said cleaning member when on said holder being in position to bear against a surface of said film to tend to clean said surface as the film moves past said cleaning member, said cleaning member having a substantial cavity near its center of rotation to form a reservoir in which dirt may accumulate.

3. Means for cleaning moving picture film while the film is in motion, comprising a holder mounted for rotation about an axis adjacent a moving section of the film, and a separate double faced annular cleaning member placeable on said holder with either face of said member faced outwardly in position to bear against a surface of said film to tend to clean said surface as the film moves past said cleaning member, said annular cleaning member having a substantial cavity near its center to form a reservoir in which dirt may accumulate.

4. Means for cleaning moving picture film while the film is in motion, comprising means forming a bearing laterally offset from one edge of a moving section of film, a generally disk-like holder mounted for rotation on said bearing means and lying approximately in a plane parallel to and slightly spaced from said section of film, an annular reversible disk-like cleaning ring having an inner peripheral edge and an outer peripheral edge and having two opposite substantially flat faces either one of which may be placed against said holder with the other face lying partially against said moving section of film, and means on said holder spaced substantially outwardly from the axis of rotation thereof for engaging one of said peripheral edges of said cleaning ring to maintain said cleaning ring in proper relation on said holder.

5. A construction according to claim 1, in which said cleaning members are made of a composition including particles of cork, jute fibers, and a binder.

6. As a new article of manufacture, a cleaning member for cleaning the sound track of a moving picture film, said member comprising a disk-like body of a composition including particles of cork, cellulosic fibers, and a binder.

7. As a new article of manufacture, a cleaning member for cleaning the sound track of a moving picture film, said member comprising an annular disk of a composition whose principal ingredients are particles of cork, jute fibers, and a binder.

ROY J. FISHER.